C. R. & J. O. Taber.
Dropping Platform for Harvester.
N° 76269. Patented Mar. 31, 1868.

WITNESSES.
N B Smith
Alex Mahon

C. R. Taber
J. O. Taber
by their attorney
Addison M Smith

United States Patent Office.

C. R. TABER AND J. OSCAR TABER, OF SALEM, OHIO.

Letters Patent No. 76,269, dated March 31, 1868.

IMPROVEMENT IN DROPPING-PLATFORMS FOR HARVESTERS.

*The Schedule referred to in these Letters Patent and making part of the same.*

TO ALL WHOM IT MAY CONCERN:

Be it known that we, C. R. TABER and J. OSCAR TABER, of Salem, county of Columbiana, and State of Ohio, have invented a new and useful Improvement in "Droppers" or Dropping-Platform for Harvesters; and we do hereby declare the following to be a full, clear, and exact description of the same, reference being had to the accompanying drawings, making a part of this specification, in which—

Figure 1:
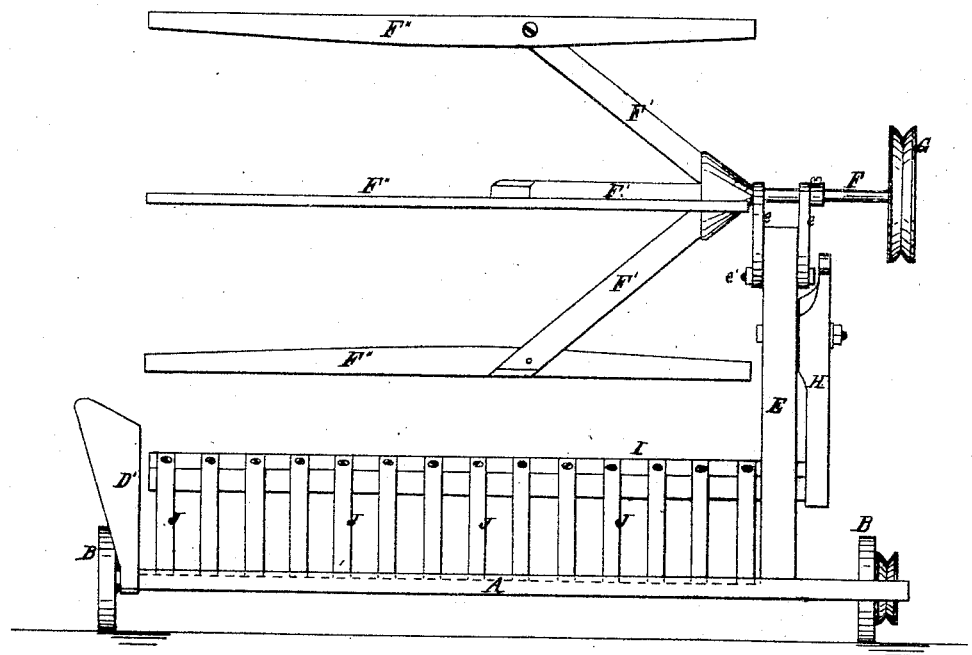
Figure 2:
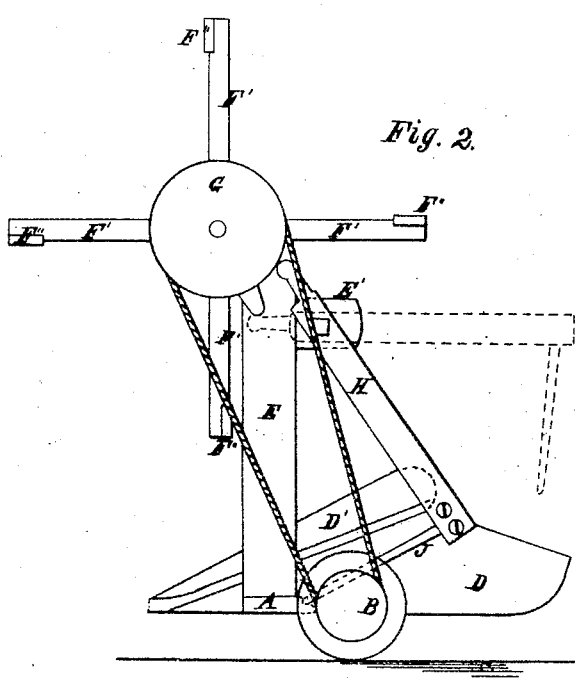

Figure 1 is a front elevation of so much of a harvesting-machine as is necessary to show our improvements, and Figure 2 is a side elevation of the same, showing the relation of the platform and finger-bar when the former is in position to receive the falling grain; also showing, in red lines, the position of the platform when raised to discharge the grain.

Similar letters of reference denote corresponding parts in both figures.

Our invention relates to the construction and manner of suspending the dumping-platform and the overhung reel; and consists, first, in making a vibrating-dropper of slats supported at their rear ends only by a swinging bar or arm arranged in a line parallel, or nearly parallel, with the finger-bar, as hereinafter set forth; second, in suspending the dumping-platform composed, of a series of parallel slats arranged in line with the path of the machine, by means of a single swinging arm arranged at the inner or main-frame end of the platform, substantially as hereinafter described; third, in combining a dumping-platform, operated as hereinafter described, with the single reel support or post and overhung reel; and fourth, in the particular means for supporting and adjusting the overhung reel, hereinafter described.

In the accompanying drawings, A represents the finger-bar of a harvesting-machine, which may be either rigid or hinged, front or rear cut, as preferred, but intended in this instance to represent a hinged bar mounted upon two small carrying-wheels B B, one at each end, attached respectively to the inner shoe and outer dividing-board D, and made adjustable thereon in any desired or usual manner to regulate the height of the bar from the ground. E is the reel-standard, mounted on the inner end of the finger-beam or on the shoe, to the upper end of which is connected a hinged or adjustable extension consisting of two perforated links, $e\ e$, secured by a single adjusting-bolt, $e'$, the upper, perforated, swinging ends of which arms or links afford bearings for the shaft F of the overhung reel in the manner shown in fig. 1. By this arrangement of the reel-support, it will be seen that by loosening the bolt $e'$, the link-reel support may be swung forward or back for the purpose of changing the relation of the reel to the cutting-apparatus, or, if desired, the links being independent, the reel may be swung slightly out of its parallel relation to the finger-bar to adapt it to the character of the ground or of the grain upon which it operates. The outer end of shaft F is provided with a funnel-shaped head, to which the diagonal reel-arm F' or braces are bolted, or otherwise firmly secured; said arms being provided at their outer ends with the ribs or beaters F'', in the usual manner. G is a pulley, on the inner or main-frame end of the reel-shaft, to which motion is communicated by means of a belt from a pulley on the inner carrying-wheel, in the manner represented in the drawings, or from a pulley on the main drive-wheel axle, as may be preferred. H is an arm, pivoted at or near its upper end to the reel-standard E, or to an arm, E', attached thereto, to the lower end of which arm H is connected the inner end of a horizontal bar, I, arranged in rear of the finger-bar, in line parallel therewith, and slightly above the same, to which the rear ends of the slats J, which compose the platform, are attached, as represented in fig. 1. The forward ends of the slats J, when the platform is in position to receive the falling grain, rest upon a ledge or rebate upon the rear edge of the finger-bar. D' is an inclined deflecting-board, secured to the divider, which serves to throw the grain inward upon the platform in a manner that will be readily understood. The pivoted platform-arm H has formed upon or attached to its upper end a handle or lever, by means of which the platform is operated or thrown up into position, shown in red lines, fig. 2, to discharge the grain. Said handle or lever may be of any suitable form or construction, such as will bring it into convenient position to be operated by the driver in his seat on the machine, or, if preferred, the platform may be operated automatically by suitable connection with a cam or eccentric on the main drive-wheel or axle of the machine.

In operation, a quick movement should be given to the platform, both in discharging the gavel and in returning the platform to its proper position to receive the grain, in order to prevent the straggling or scattering of the grain. Where such quick movement is given, the following reel-rib serves as a sufficient cut-off to the falling grain to insure the discharge of the grain upon the platform in a neat and compact form.

Having now described our invention, what we claim, and desire to secure by Letters Patent, is—

1. A vibrating or swinging dropper composed of slats supported at their rear ends only, in combination with the ledge or rebate upon the finger-bar, substantially as described.

2. A slatted dropper suspended upon a single vibrating-arm at its inner end, substantially as described.

3. The combination of the vibrating-dropper with the single standard or support of the overhung reel, substantially as described.

4. The links or arms $e\ e$, in which the reel-shaft has its bearing, by means of which the reel is adjusted upon its single standard or support, as described.

C. R. TABER,
J. OSCAR TABER.

Witnesses:
   THOMAS KENNETT,
   PETER AMBLER.